US008222304B2

United States Patent
Castaing et al.

(10) Patent No.: US 8,222,304 B2
(45) Date of Patent: Jul. 17, 2012

(54) PROCESS FOR THE TREATMENT OF A HYDROPHOBIC SURFACE BY AN AQUEOUS PHASE

(75) Inventors: Jean-Christophe Castaing, Burlington, NJ (US); Ashwin Rao, Piscataway, NJ (US)

(73) Assignee: Rhodia Operations, Aubervilliers (FR)

( * ) Notice: Subject to any disclaimer, the term of this patent is extended or adjusted under 35 U.S.C. 154(b) by 453 days.

(21) Appl. No.: 12/294,178

(22) PCT Filed: Mar. 22, 2007

(86) PCT No.: PCT/EP2007/052774
§ 371 (c)(1),
(2), (4) Date: Jun. 15, 2009

(87) PCT Pub. No.: WO2007/107605
PCT Pub. Date: Sep. 27, 2007

(65) Prior Publication Data
US 2009/0305048 A1   Dec. 10, 2009

Related U.S. Application Data

(60) Provisional application No. 60/785,289, filed on Mar. 23, 2006.

(51) Int. Cl.
*C09D 5/02* (2006.01)
*C09D 7/12* (2006.01)

(52) U.S. Cl. ............ 516/198; 428/411.1; 428/412; 428/426; 428/457; 428/473; 428/474.4; 428/480; 428/500; 428/702

(58) Field of Classification Search ............ 516/198; 428/412, 411.1, 426, 457, 473, 480, 500, 428/702
See application file for complete search history.

(56) References Cited

U.S. PATENT DOCUMENTS

| 3,515,557 A * | 6/1970 | Chu et al. ............... 430/503 |
| 3,586,568 A | 6/1971 | Campbell |
| 3,658,573 A | 4/1972 | Guestaux et al. |
| 4,629,753 A * | 12/1986 | Quinn ............... 524/394 |
| 5,914,102 A | 6/1999 | Fowler et al. |
| 6,262,169 B1 | 7/2001 | Helmer et al. |
| 2002/0028288 A1 | 3/2002 | Rohrbaugh et al. |
| 2003/0018103 A1 * | 1/2003 | Bardman et al. ........ 523/204 |
| 2005/0085584 A1 * | 4/2005 | Musch et al. ........... 524/493 |

FOREIGN PATENT DOCUMENTS

| EP | 1413608 | 4/2004 |
| JP | 08-283042 | 10/1996 |
| JP | 2000/178042 | 6/2000 |
| WO | WO 02/083328 | 10/2002 |
| WO | WO 2005/071023 | 8/2005 |

OTHER PUBLICATIONS

Lanxess (Tributyl_phosphate_e), Jul. 16, 2009.*
Chemical Database Online ("Properties of tributyl phosphate"), http://poc.chemnetbase.com/Scripts/pocweb.exe?document-pp+p7E1H2v1Lq7+0+23557+0.*
page 7, (EHC 112, 1991) tri-n-butyl phosphate, International Program on Chemical Safety (ICPS), 1991.*
International Search Report from PCT/EP2007/052774 dated Nov. 15, 2007.
JP 2000/178042—Japanese Pant Office—http://www19.ipdl.inpit.go.jp/PA1/result/detail/main/w2-7iyaDA412178042Pl.htm, Jun. 27, 2000.
JP 08-283042—Japanese Patent Office—http://www19.ipdl.inpit.go.jp/PAl/result/detail/main/wR-7eUaDA408283042Pl.htm, Oct. 29, 1996.

* cited by examiner

*Primary Examiner* — Ling Choi
*Assistant Examiner* — Chun-Cheng Wang
(74) *Attorney, Agent, or Firm* — Hunton & Williams, LLP

(57) ABSTRACT

The invention relates to process for the treatment of a hydrophobic surface by a liquid film comprising an aqueous phase comprising the coating of said surface by the liquid whose aqueous phase comprises an effective amount of surface properties modifying agent and an active agent.

11 Claims, 1 Drawing Sheet

PROCESS FOR THE TREATMENT OF A HYDROPHOBIC SURFACE BY AN AQUEOUS PHASE

Figure 1:
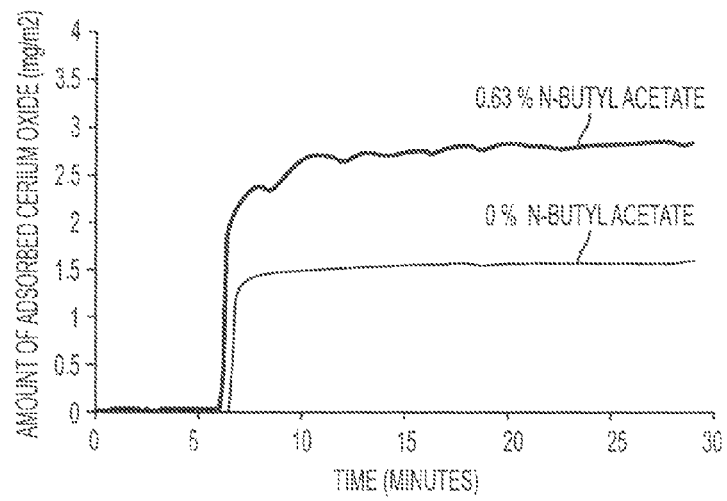

This application is the U.S. National Phase Application of International Application No. PCT/EP2007/052774 filed Mar. 22, 2007, which claims benefit to U.S. Application No. 60/785,289 filed Mar. 23, 2006, both of which are incorporated by reference.

The present invention relates to a process for the treatment of a hydrophobic surface by means of a liquid film containing an aqueous phase including an agent for the modification of the properties of the hydrophobic surface. The liquid film is typically a solution containing water, a partially water soluble organic compound that spontaneously forms a film at the water-surface interface and an agent for the modification of the properties of the hydrophobic surface.

One of the goal of the process according to the invention is to modify the physicochemical properties of a hydrophobic surface by an aqueous phase (such as a solution) in order to promote and facilitate treatments of said surface by an active agent contained in the liquid film (aqueous phase) and in particular to provide properties of hydrophilizing, wetting, soil release, sustained release of perfumes or biocides and/or improving activity of an agent. An agent for the modification of the properties of the hydrophobic is believed to assist in providing the above hydrophilizing, wetting, soil release, sustained release of perfumes or biocides and/or improving activity. The invention also allows reducing the amount of surfactants being used to treat surfaces (or even to avoid their use), which can be benefic for the environment or at least perceived as benefic.

Thus, the object of the invention is a process for the treatment of a hydrophobic surface by a liquid film comprising an aqueous phase, said process comprising the coating of said surface by the liquid whose aqueous phase comprises an effective amount of an agent of modification of the properties of surface and an active agent.

In one fashion, the aqueous phase of the liquid of treatment (such as a solution) comprises an agent for the modification of the hydrophobic properties of surfaces (AMHPS) is a substance, polymer or molecule:
 suitable for spontaneously form a film nanometric on the interface water of the aqueous phase/hydrophobic surface;
 partially water soluble, this solubility in water being lower than 1% and higher than 0.001%;
 having a relative permittivity ($\epsilon r$) lower than 80 and higher than that of the hydrophobic surface to treat or a refractive index greater than 1.33 and lower than that of the hydrophobic surface;
 having a surface tension water/agent ranging between 5 mN/m and 50 mN/m; and
 being in a liquid state at ambient temperature with a viscosity ranging from 1 mPA·s to 100 mPa·s.

The liquid of treatment (such as the solution) can comprise water, the agent (henceforth called AMHPS) that is capable of spontaneously forming a film at the water-substrate interface and an active material, preferably a surface active material that adsorbs at the interface of the liquid and the surface.

The liquid film according to the invention can be a liquid composition applied to the surface to be treated, let to dry, or rinsed.

According to the invention, an effective amount of AMHPS can range between 5% and 95% of the maximum solubility concentration of the AMHPS agent in water.

Generally speaking, the AMHPS agent can be a substance, either electrically neutral, or charged. It can also be a mixture of molecules or substances corresponding to the characteristics described above. In particular, it can be a mixture of charged molecules and neutral molecules, preferentially containing a small fraction of charged molecules, lower than 10% in number.

The AMHPS agents can assist in improving the effectiveness of the surface treatments. For example it can assist in the delivery and/or retention of the surface active agents at the interface. The surface active agents may impart properties such as hydrophilicity, static discharge, catalysis, UV-absorption, photoluminescence, anti-fouling or extended release of substances such as perfumes or biocides to the treated interface.

The improvement of the effectiveness can b judged by obtaining identical performances with a smaller rate of active agent providing the aforementioned properties or by a greater durability of the sought effect, for example by a resistance to a higher number of rinsings of the treated hydrophobic surface. The effectiveness of AMHPS agents in delivering surface active agents to an interface can b inferred by the direct comparison of a specific surface property such as wetting of a surface that has been treated with a solution containing an AMHPS to that of a surface treated with a solution not containing the AMHPS.

Without limiting the scope of the invention to a particular scientific theory, it is possible to explain the operating mode of the AMHPS in the following way: Because of their relative permittivity or, more precisely, their Hamaker constants and their surface tensions, the AMHPS, when they are present in the aqueous phase of treatment at a concentration lower or equal to the maximum solubility concentration, spontaneously form a liquid film which is a few nanometers thick on the surface. There the Hamaker constant of the AMHPS preferably ranges between that of the substrate and that of water. The formation of the liquid film of AMHPS is generally very fast, generally about a few tens of milliseconds, which makes the treatment compatible with the industrial processes.

The thickness of the liquid film usually depends on the AMHPS concentration. This film can be very thick, higher than 10 nm (nanometer) if the AMHPS concentration is that of the maximum solubility limit. If the concentration is lower, the film gets thinner as the difference with the maximum solubility concentration becomes more important. This liquid film is formed spontaneously and its formation is not affected by the presence of the other ingredients of the formulation such as polymers and surface-active agents.

Due to the fact that the AMHPS film is only a few nanometers thick, it is possible to treat a solid substrate with an aqueous solution that contains a few parts per million (ppm) of AMHPS.

In order to enhance the delivery of surface active components to an interface in the presence of AMHPS, the aqueous phase may be modified by the addition of an organic or inorganic electrolyte salt having monovalent or multivalent anions and/or cations preferably present in a concentration lower than 0.1 Wt % and preferably higher than 0.001 Wt % of the total weight of the aqueous phase. Suitable cations may be monovalent or multivalent, may be organic or inorganic, and include, for example, sodium, potassium, lithium, calcium, magnesium, cesium, and lithium cations, as well as mono-, di- tri- or quaternary ammonium or pyridinium cation. Suitable anions may be a monovalent or multivalent, may be organic or inorganic, and include, for example, chloride, sulfate, nitrate, nitrite, carbonate, citrate, cyanate acetate, benzoate, tartarate, oxalate, phosphate, and phosphonate anions. Suitable electrolytes include, for example, salts of multivalent anions with monovalent cations, such as potassium pyrophosphate, potassium tripolyphosphate, and sodium citrate, salts of multivalent cations with monovalent anions, such as calcium chloride, calcium bromide, zinc halides, barium chloride, and calcium nitrate, and salts of monovalent cations with monovalent anions, such as sodium chloride, potassium chloride, potassium iodide, sodium bromide, ammonium bromide, alkali metal nitrates, and ammonium nitrates. Preferred salts are $NaNO_3$, $KNO_3$, KCL, NaCl, $NH_4NO_3$, or $NH_4Cl$.

The formation of the liquid film of AMHPS is generally very fast, generally about a few tens of milliseconds, which makes the treatment compatible with the industrial processes.

The formation of film is initially influenced by the physical nature of the material constitutive of the hydrophobic surface to treat and depends less upon the chemical nature of that surface and, thus, badly glossy or badly cleaned surfaces can be treated in a similar way.

The AMHPS agents can be selected for example in the family of mono, di or tri ester of phosphates, more particularly among those of the following formula (I):

$$O=P(OR_1)(OR_2)(OR_3) \quad (I)$$

wherein, $R_1$, $R_2$, and $R_3$, identical or different are:
  a hydrogen atom, or
  a radical alkyl saturated or unsaturated, linear or ramified or cyclic, having from 1 to 22 atoms of carbon, preferably from 2 to 12 atoms of carbon, and even more preferably from 2 to 8 carbon atoms, optionally substituted by halogen atoms, such as fluorine or chlorine, hydroxyl groups, ether groups having between 1 and 12 carbon atoms, preferably between 1 and 6 carbon atoms, thioether groups, ester groups, amide groups, carboxy group, acid sulphonic groups, anhydride carboxylic groups, and/or carbonyl groups, or—an aryl radical, having from 6 to 22 atoms of carbon, preferably from 6 to 8 carbon atoms, optionally substituted by halogen atoms, such as fluorine or chlorine, hydroxyl groups, ether groups having between 1 and 12 carbon atoms, preferably between 1 and 6 carbon atoms, thioether groups, ester groups, amide groups, carboxy group, acid sulphonic groups, anhydride carboxylic groups, and/or carbonyl groups, and at least one of $R_1$, $R_2$ or $R_3$ is different from a hydrogen atom. Some examples of mono, di or tri ester of phosphates, may be:
  tris(2-ethylhexyl) phosphate,
  tris(2-butoxyethyl)phosphate,
  di(2-ethylhexyl)phosphate,
  mono(2-ethylhexyl)phosphate,
  tris(2-isooctyl)phosphate,
  tricrésylphosphate,
  crésyldiphénzylphosphate,
  trixylilphosphate,
  triphénylphosphate,
  tributyl phosphate,
  triethyl phosphate,
  tri(2chloroethyl)phosphate, or their mixtures.

The mono, di or tri phosphate ester of the agent according to the invention can be also built-in in a liquid form or in the form of a solid powder in a composition of film forming polymer insoluble in water or in a phyto, detergent or cosmetic composition comprising an aqueous phase. If the mono, di or tri phosphate ester of the invention is presented in a liquid form at ambient temperature, as it is the case of the particular compounds listed above except for the triphenylphosphate which is solid at ambient temperature, it is possible to adsorb them on an inert mineral support to obtain a solid powder. A preferred mode of embodiment to prepare the solid powder of mono, di or tri esters of phosphate is a process comprising the step of dry impregnating a mineral oxide by a sufficient quantity of the mono, di or tri esters of phosphate.

Agents AMHPS can be for example also selected in the family of organic esters including esters of vegetable or animal origin, or esters the mono- di or triglyceride, partially hydrolyzed, alcohols with limited solubility in water, non-polar organic solvents such as cyclohexane, aromatic solvents such as toluene, chlorinated solvents such as chloroform, and vinyl pyrolidone.

Preferred esters are compounds of the following formula (II):

$$R1-C(=O)-O-R2 \quad (II)$$

wherein the radicals R1 and R2 have the same meaning as in formula (I) above.

Surface active agents used in the formulation may include mineral oxide nanoparticles, polymeric latexes, ionic or non ionic surfactants, neutral or charged polymers, supramolecular assemblies of polymers or mixtures of the above materials.

Examples of mineral oxides include silica, alumina, silica-alumina, silico-aluminate of sodium, calcium silicate, magnesium silicate, zirconia, magnesium oxide, calcium oxide, cerium oxide or titanium oxide. The mineral oxide can be totally or partially hydroxylated or carbonated. The mineral oxide may have a large surface area. The preferred mineral oxide is a silica, in a way even more preferential an amorphous silica. That one can be a natural silica or a synthetic silica like silica gels, fumed silicas or, in a very preferred way, precipitated silicas. The mineral particles may also be impregnated with additives such as fragrances, pesticides or drugs. Additionally, the mineral oxide particles as well as latex particles may themselves be impregnated by the AMHPS.

The liquid composition of treatment can be an aqueous film forming polymer dispersion (latex) in post-polymerization. Then, optionally, the latex can be dried out on the treated hydrophobic support. The mono, di or tri ester of phosphate can be added directly to the liquid composition of treatment, in an amount ranging between 0.01 and 5% in dry weight of mono, di or tri ester of phosphate, preferably between 0.02 and 1%, based on the total weight of the composition. This active agent can be a molecule, substance or polymer conferring a function particular to the composition. The active agents can be associative water-soluble polymers, water-soluble zwiterionic polymers, amphoteric water-soluble polymers, water-soluble polymers having a cationic charge. These active agents can be for example surface-active agents, mineral particles, organic like dyes or perfumes, having a modifying action of the wettability (hydrophilization or hydrophobization) or providing soil-release properties. These active agents associated with the AMHPS agents, present an upgraded action. The active substances such as perfume, biocide, insecticide, softener, can be delivered by the AMHPS agents which more effectively transport them towards the hydrophobic surface to treat.

AMHPS can have a direct role in delivering an active molecule to a surface whenever that agent, a perfume for example, has a higher solubility in the AMHPS agents than in water. In this case, the liquid film of the AMHPS agents is used as a source for the active agent. The AMHPS agents can be carried not only by a latex or a mineral oxide, such as silica particles, but also via an emulsion, of a lamellar phase or microgels. Another aspect of the invention making it possible to benefit from the ability of the AMHPS agents to form a liquid film in the vicinity of a damaged surface (damaged hair, striped surface). Capillary forces at these surfaces can then be exploited to reinforce the adsorption of the surface active species such as nanoparticles or latexes to heal the defects on the surface. There can be mechanisms of transport of the species adsorbed on the surface (of the particles, polymers) which make it possible to reinforce adsorption on the level of the defect. That can make it possible to make a curative treatment which would selectively target the defect (healing treatment).

One embodiment of the present invention is the use of a water soluble AMHPS agent that vitrifies upon the evaporation of water. Such an agent will provide a mechanically resistant film of adsorbed materials at the surface. It is possible to consider partially water soluble AMHPS agents but presenting a vitreous transition upon drying. Thus, after drying the formulation, the liquid film would thus become solid and, thus, mechanically more resistant.

The hydrophobic surfaces to be treated are for example made of polyesters, PVC, polyethylenterphtalate, polycarbonate, polyamides, or polyolefins such as polyethylene and polypropylene. These surfaces can be hair, human skin, human hair, natural or synthetic fibers, crockery, metal objects, glass or ceramics. The surface can be different from polystyrene. The liquid is typically different from a liquid having a hydraulic binder (such as cement, plaster, concrete etc).

The treatment of the invention can be applied for example in home hard surface care, industrial or institutional cleaning for example of hard surfaces, personal-care, laundry, fibers and/or fabric industrial treatments.

Figure 2:
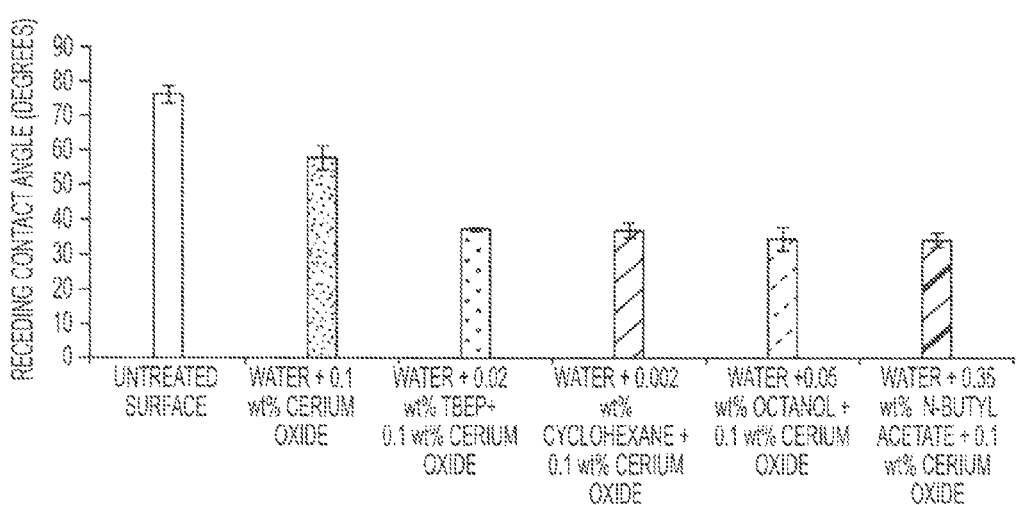

The invention is further illustrated in the following examples. Reference is made to the enclosed drawing wherein:

FIG. 1 is a chart showing the adsorption kinetics of cerium oxide nanoparticles onto HMDS coated silicon substrates, and FIG. 2 is a chart showing the receding contact angles of water on polypropylene surfaces treated with cerium oxide solutions containing organic solvents.

EXAMPLE 1

Silicon (refractive index: 1.46) modified by treatment with hexamethylene disilazane (HMDS) is used as the first surface. The receding contact angle of water on the silicon surface is 69 degrees. This surface is treated by immersion in a 0.1 wt % aqueous suspension of cerium dioxide nanoparticles having a diameter of 10 nm at pH of 1 for over 2 hours and then rinsed to remove any unadsorbed nanoparticles. After drying, the receding contact angle of water on the treated surface is measured. The receding contact angle of water on the treated substrate had reduced from 69 degrees to 53 degrees.

To enhance the adsorption of cerium oxide nanoparticles, n-butyl acetate used as the as the AMHPS having a refractive index: 1.394 at a concentration of 0.63 wt % is added to an aqueous solutions containing 0.1 wt % cerium oxide at pH 1.5. Then, a HMDS treated silicon substrate is immersed in this solution for over two hours and treated as described above. The receding contact angle of water on the treated surface is then measured. The value of the receding contact angle is 45 degrees. The results are gathered in the table 1 below:

TABLE 1

| Contact angles with water | | |
|---|---|---|
| Untreated surface | Surface treated with the active only (nano-CeO2) | Surface treated with the active in the presence of AMHPS (n-butyl acetate) |
| 69 deg. | 53 deg. | 45 deg. |

This reduction in the receding contact angle occurs due to enhanced adsorption of the cerium oxide nanoparticles in the presence of a wetting film of the added co-solvent on the hydrophobic polymer surface.

To prove the hypothesis of enhanced adsorption, the kinetics of adsorption of the nanoparticles are measured by light reflectance spectroscopy using the technique disclosed by Dijt, J. C.; Cohen Stuart, M. A.; Fleer, G. J.; "Reflectometry as a tool for adsorption studies"; *Adv. Colloid. Interface. Sci.* 1994, 50, 79.

The results of these measurements, which are plotted in FIG. 1, indicate that the adsorption of cerium oxide nanoparticles onto the silicon substrates increases by a factor of 2 due to the presence of 0.63 wt % n-butyl acetate.

EXAMPLE 2

Polycarbonate (refractive index: 1.586) plaques are used as a hydrophobic surface. The receding contact angle of water on an untreated polycarbonate surface is 55 degrees. This surface is treated by immersion in a 0.1 wt % aqueous suspension of cerium dioxide nanoparticles having a diameter of 10 nm at pH of 1.5. The polycarbonate plaque is immersed in the aforementioned suspension of nanoparticles for over 2 hours and then rinsed to remove any unadsorbed nanoparticles. After drying, the receding contact angle of water on the treated surface is measured. The receding contact angle of water on the treated substrate is 55 degrees indicating no adsorption of nanoparticles on this surface.

To enhance the adsorption of cerium oxide nanoparticles, n-butyl acetate used as an AMHPS at a concentration of 0.63 wt % is added to an aqueous solution containing 0.1 wt % cerium oxide at pH 1.5 A polycarbonate plaque is immersed in this solution for over two hours and treated as described above. The receding contact angle of water on the treated surface is then measured. The value of the receding contact angle is 32 degrees. The results are gathered in the table 2 below:

TABLE 2

| Contact angles with water | | |
|---|---|---|
| Untreated surface | Surface treated with the active only (nano-CeO2) | Surface treated with the active in the presence of AMHPS (n-butyl acetate) |
| 55 deg. | 55 deg. | 32 deg. |

EXAMPLE 3

Nylon 6,6 (refractive index: 1.53) plaques are used as a hydrophobic surface. The receding contact angle of water on an untreated nylon surface is 53 degrees. This surface is treated by immersion in a 0.1 wt % aqueous solution of cerium oxide at pH of 1.5. The Nylon 6,6 plaque is immersed in the aforementioned solution for over 2 hours and then rinsed to remove any unadsorbed nanoparticles. After drying, we measured the receding contact angle of water on the treated surface. The receding contact angle of water on the treated substrate was unchanged indicating no adsorption of nanoparticles To enhance the adsorption of cerium oxide nanoparticles, n-butyl acetate at a concentration of 0.63 wt is added to an aqueous solutions containing 0.1 wt % cerium oxide at pH 1.5 A Nylon 6,6 plaque is immersed in this solution for over two hours and treated as described above. The receding contact angle of water on the treated surface is then measured. The value of the receding contact angle is 34 degrees. The results are gathered in the table 3 below:

TABLE 3

| | Contact angles with water | |
|---|---|---|
| Untreated surface | Surface treated with the active only (nano-CeO2) | Surface treated with the active in the presence of AMHPS (n-butyl acetate) |
| 53 deg. | 53 deg. | 34 deg. |

EXAMPLE 4

Polypropylene (refractive index: 1.49) plaques are used as a hydrophobic surface. The receding contact angle of water on an untreated polypropylene surface is 76 degrees. This surface is treated by immersion in a 0.1 wt % aqueous solution of cerium oxide at pH of 1.5. The polypropylene plaque is immersed in the aforementioned solution for over 2 hours and then rinsed to remove any unadsorbed nanoparticles. After drying, the receding contact angle of water on the treated surface is measured. The receding contact angle of water on the treated substrate had reduced from 76 degrees to 57 degrees.

To enhance the adsorption of cerium oxide nanoparticles, the following organic solvents are added to an aqueous solutions containing 0.1 wt % cerium oxide at pH 1.5
1. n-butyl acetate at a concentration of 0.35 wt %
2. Octanol (refractive index: 1.431) at a concentration of 0.05 wt %
3. Tris(2-butoxyethyl)phosphate (TBEP) (refractive index: 1.434)
4. Cyclohexane (refractive index: 1.426) at a concentration of 0.002 wt %

The receding contact angles of water on each of the treated surfaces are shown in the FIG. 2. This reduction in the receding contact angle occurs due to enhanced adsorption of the cerium oxide nanoparticles in the presence of a wetting film of the added co-solvent on the hydrophobic polymer surface.

EXAMPLE 5

Silicon oxide nanoparticles are suspended in an aqueous solution at pH 3.0. This suspension is modified by the addition of 0.1M $NaNO_3$. A polypropylene plaque is immersed in this solution for 2 hours. The treated plaque is rinsed in deionized water and air dried. The receding contact angle of water on the treated plaque is 47 degrees. To further enhance the adsorption of silicon oxide nanoparticles, 0.05 wt % Octanol is added to the solution of Silicon oxide nanoparticles at pH 3 containing 0.1M $NaNO_3$. A polypropylene plaque is immersed in this solution for two hours and then rinsed in deionized water and air dried. The receding contact angle of water on this substrate is found to be 21 degrees. The results are gathered in the table 4 below:

TABLE 4

| | Contact angles with water | |
|---|---|---|
| Untreated surface | Surface treated with the active only (nano-CeO2) in the presence of salt | Surface treated with the active in the presence of salt and AMHPS (n-butyl acetate) |
| 76 deg. | 47 deg. | 21 deg. |

The table 3 shows that a AMHPS used in combination with a highly salted formulation provides better results.

The invention claimed is:
1. A process for the treatment of a hydrophobic surface with a liquid film comprising an aqueous phase,
    said process comprising coating said surface with the liquid film,
    wherein the aqueous phase comprises an effective amount of an agent for the modification of the properties of said surface and an active agent;
    wherein the agent for the modification of the properties of said surface comprises:
        tris(2-ethylhexyl)phosphate,
        tris(2-butoxyethyl)phosphate,
        di(2-ethylhexyl)phosphate,
        mono(2-ethylhexyl)phosphate,
        tris(2-isooctyl)phosphate,
        tricresylphosphate,
        cresyldiphenylphosphate,
        trixylilphosphate,
        triphenylphosphate,
        triethyl phosphate,
        tri(2chloroethyl)phosphate; or
        a mixture thereof; and
    further wherein the agent for the modification of the properties of said surface is adsorbed onto an inert mineral support.
2. The process of claim 1, wherein the agent for the modification of the properties of said surface is a substance, polymer or molecule:
    suitable for spontaneously forming a nanometric film on the water interface of the aqueous phase/hydrophobic surface;
    partially water soluble, this solubility in water being lower than 1% and higher than 0.001%;
    having a relative permittivity (εr) lower than 80 and higher than that of the hydrophobic surface to treat or a refractive index greater than 1.33 and lower than that of the hydrophobic surface;
    having a surface tension water/agent ranging between 5 mN/m and 50 mN/m; and
    being in a liquid state at ambient temperature with a viscosity ranging from 1 mPA·s to 100 mPa·s.
3. The process of claim 1, wherein the inert mineral support comprises silica, alumina, silica-alumina, silico-aluminate of sodium, calcium silicate, magnesium silicate, zirconia, magnesium oxide, calcium oxide, cerium oxide or titanium oxide.
4. The process of claim 1, wherein the liquid film is in the form of an aqueous insoluble film forming polymer dispersion in water (latex).
5. The process of claim 1, wherein the agent for the modification of the properties of said surface is added directly to the liquid film, in an amount ranging from 0.01 to 5% in dry weight of agent for the modification of the properties of said surface, based on the total weight of the composition of said liquid film.

6. The process of claim 2, wherein the effective amount of the agent for the modification of the properties of said surface ranges from 5% to 95% of the maximum solubility concentration of the agent for the modification of the properties of said surface in water.

7. The process of claim 1, wherein the hydrophobic surface to be treated is PVC, polyethylenterphtalate, polycarbonate, polyamide, polyolefin, polyethylene, polypropylene, human skin, human hair, natural fibers, synthetic fibers, crockery, metal objects or ceramics.

8. The process of claim 1, wherein the aqueous phase is modified by the addition of an organic or inorganic electrolyte salt having monovalent or multivalent anions and/or cations.

9. The process according to claim 8, wherein the salt is present in a concentration lower than 0.1 wt % of the total weight of the aqueous phase.

10. The process according to claim 8, wherein suitable electrolytes include organic salts, inorganic salts, and mixtures thereof.

11. The process of claim 5, wherein the agent for the modification of the properties of said surface is added directly to the liquid film, in an amount ranging from 0.02 to 1% in dry weight of agent for the modification of the properties of said surface, based on the total weight of the composition of said liquid film.

* * * * *